United States Patent
Imai et al.

(10) Patent No.: US 6,800,587 B2
(45) Date of Patent: Oct. 5, 2004

(54) IRON COMPOUND CATALYST FOR INHIBITING GENERATION OF DIOXIN

(75) Inventors: Tomoyuki Imai, Hiroshima (JP); Toshiki Matsui, Hiroshima (JP); Yasuhiko Fujii, Hiroshima (JP); Satoshi Hatakeyama, Hiroshima-ken (JP); Kojiro Tsutsumi, Hiroshima (JP); Tomoko Okita, Hatsukaichi (JP); Hiroshi Inoue, Okayama (JP); Tatsuaki Baba, Bizen (JP); Masaki Ishihara, Okayama-ken (JP); Takashi Okamura, Bizen (JP)

(73) Assignees: Toda Kogyo Corporation, Hiroshima-ken (JP); Naikai Plant Kabushiki Kaisha, Okayama-ken (JP)

( * ) Notice: Subject to any disclaimer, the term of this patent is extended or adjusted under 35 U.S.C. 154(b) by 0 days.

(21) Appl. No.: 09/840,878

(22) Filed: Apr. 25, 2001

(65) Prior Publication Data

US 2001/0031235 A1 Oct. 18, 2001

Related U.S. Application Data

(62) Division of application No. 09/303,405, filed on May 3, 1999.

(51) Int. Cl.$^7$ ................................................ B01J 23/70
(52) U.S. Cl. ...................................................... 502/338
(58) Field of Search ................................ 502/338, 325, 502/258

(56) References Cited

U.S. PATENT DOCUMENTS

| | | | |
|---|---|---|---|
| 3,925,001 A | 12/1975 | Salooja | |
| 4,018,706 A | 4/1977 | Inoue et al. | |
| 4,084,545 A | 4/1978 | Nack et al. | |
| 4,495,874 A | 1/1985 | Greskovich | |
| 4,668,658 A | * 5/1987 | Jennings | 502/336 |
| 4,979,447 A | 12/1990 | Farrar | |
| 4,992,406 A | * 2/1991 | Mauldin et al. | 502/304 |
| 5,036,032 A | * 7/1991 | Iglesia et al. | 502/260 |
| 5,254,797 A | 10/1993 | Imoto | |
| 5,260,044 A | 11/1993 | Hiraoka et al. | |
| 5,380,507 A | 1/1995 | Hiltunen et al. | |
| 5,648,591 A | 7/1997 | Donecker et al. | |
| 5,656,566 A | * 8/1997 | Ward | 502/316 |
| 5,744,690 A | 4/1998 | Yokoyama et al. | |
| 5,914,436 A | 6/1999 | Klabunde et al. | |
| 5,994,611 A | 11/1999 | Nishihara et al. | |

FOREIGN PATENT DOCUMENTS

| | | |
|---|---|---|
| DE | 4021135 A1 | 1/1992 |
| EP | 0252521 A | 1/1988 |
| EP | 0387417 A1 | 9/1990 |
| EP | 0908223 A1 | 4/1999 |

* cited by examiner

Primary Examiner—Stanley S. Silverman
Assistant Examiner—Edward M. Johnson
(74) Attorney, Agent, or Firm—Nixon & Vanderhye P.C.

(57) ABSTRACT

An iron compound catalyst for inhibiting the generation of dioxin contains iron oxide particles, iron oxide hydroxide particles or mixed particles having a catalytic activity capable of converting not less than 15% of carbon monoxide into carbon dioxide when $2.8 \times 10^{-4}$ mol of iron oxide particles obtained by heat-treating the iron compound catalyst in air at a temperature of 800° C. for 15 minutes, are instantaneously contacted with $6.1 \times 10^{-7}$ mol of carbon monoxide at a temperature of 250° C. at a space velocity (SV) of 42,400 h$^{-1}$ in an inert gas atmosphere using a pulse catalytic reactor, the iron oxide particles or the iron oxide hydroxide particles have an average particle size of 0.01 to 2.0 μm, a BET specific surface area of 0.2 to 200 m2/g, a phosphorus content of not more than 0.02% by weight, a sulfur content of not more than 0.6% by weight and a sodium content of not more than 0.5% by weight. This iron compound catalyst enables complete combustion of municipal solid waste and decomposition of dioxin precursors even at a low combustion temperature in intermittently operated incinerators such as mechanical batch incinerators or semi-continuous incinerators, and can inhibit dioxin generation of due to a memory effect upon low-temperature combustion at the start-up or shut-down of the incinerators, without large-scale incinerator renovation or plant and equipment investment.

8 Claims, 2 Drawing Sheets

IRON COMPOUND CATALYST FOR INHIBITING GENERATION OF DIOXIN

This application is a division of Ser. No. 09/303,405 filed May 3, 1999, now pending, the entire content of which is hereby incorporated by reference in this application..

BACKGROUND OF THE INVENTION

The present invention relates to an iron compound catalyst for inhibiting the generation of dioxin and an incineration process of a municipal solid waste using the catalyst, and more particularly, to an iron compound catalyst for inhibiting the generation of dioxin, which enables complete combustion of a municipal solid waste and decomposition of dioxin precursors even at a low combustion temperature in intermittently operated municipal solid waste incinerators such as mechanical batch incinerators or semi-continuous incinerators, and which can inhibit the generation of dioxin due to a memory effect upon low-temperature combustion at the start-up or shut-down of the incinerators, without large-scale incinerator renovation or plant and equipment investment, and a incineration process of municipal solid waste using such an iron compound catalyst.

Upon waste disposal, various municipal solid wastes have been divided into reusable ones and the others. After the reusable ones are recovered as effective resources, remaining combustible municipal solid wastes have been usually incinerated. Municipal solid waste incinerators used for waste disposal are classified into four types according to its operation time a day (i.e., into mechanical batch incinerators, fixed batch incinerators, semi-continuous incinerators and full-continuous incinerators).

In large-scale continuously operated incinerators, incineration atmosphere and incineration temperature is maintained in a steady state, so that the incineration can be continuously conducted at a high temperature, resulting in complete combustion of municipal solid wastes and even heat-decomposition of chlorine compounds. Therefore, in such continuously operated incinerators, although chlorine gas or hydrogen chloride gas is generated, the amount of extremely harmful dioxin generated is relatively small. The dioxin is undecomposable in natural environment, and, therefore, when being taken into human bodies through water, the dioxin is accumulated within the human bodies, thereby causing a problem concerning a high carcinogenesis.

On the other hand, most of the intermittently operated incinerators have been operated only when a certain amount of municipal solid wastes is gathered or at predetermined time intervals. Accordingly, it takes several hours from the start-up until the incinerator can be operated in a safe and steady state. At every start-up operation, there is caused a low-temperature combustion condition in which the dioxin tends to be generated. Also, when the incinerator is stopped, a part of the municipal solid wastes is continued to smoke while causing incomplete combustion thereof. In such a case, when the incinerator is started up again, unburned substances caused due to incomplete combustion upon the shut-down of the incinerator on the previous day and upon the start-up thereof on the next day, still remain inside a flue of the incinerator or a dust collector. In consequence, there has been pointed out such a disadvantage that such a so-called memory effect that dioxin is re-synthesized and then discharged into an exhaust gas even though the temperature of the exhaust gas is as low as not more than 200° C., is caused and continued for several hours after the start-up of the incinerator (refer to Kawakami, Mtsuzawa and Tanaka, "Lecture Papers of the 5th Meeting of Japan Waste Matter Institute", p. 264 (1994)).

At the present time, the generation of dioxin from such intermittently operated incinerators has become a social problem.

Therefore, it has been strongly desired to provide a catalyst for inhibiting the generation of dioxin, which enables complete combustion of municipal solid wastes and decomposition of dioxin precursors in the existing mechanical batch incinerators or semi-continuous incinerators, and can avoid the generation of dioxin due to the memory effect upon low-temperature combustion at the start-up or shut-down of these incinerators, without a large-scale incinerator renovation or plant and equipment investment, and an incineration process of municipal solid waste using such a catalyst which enables complete combustion of municipal solid wastes and decomposition of dioxin precursors in the existing mechanical batch incinerators or semi-continuous incinerators, and can avoid the generation of dioxin due to the memory effect upon low-temperature combustion at the start-up or shut-down of these incinerators.

Hitherto, as the prior arts relating to absorption or decomposition of extremely poisonous dioxin, various methods have been reported. For example, there are known a method of adsorbing harmful components such as dioxin with a cement-containing adsorbent after cooling an exhaust gas discharged from a municipal solid waste incinerator, separating and recovering dusts collected together with the adsorbent, and then kneading and solidifying a mixture of dusts and adsorbent recovered (Japanese Patent Application Laid-Open (KOAKI) No. 4-371714(1992)); a method of decomposing poly-halogenated aromatic compounds having at least five carbon atoms by heating at 200 to 550° C. in the presence of a catalyst such as iron oxide (Japanese Patent Publication (KOKOKU) No. 6-38863(1994)); a method of removing halogenated aromatic compounds or the like from an exhaust gas or reducing amounts thereof by heat-treating at 300 to 700° C. in the presence of a catalyst containing iron oxide (Japanese Patent Application Laid-Open (KOAKI) No. 2-280816(1990)); or the like.

In addition, there is known a method of preliminarily mixing combustible wastes with iron oxide or the like and burning the combustible wastes at a temperature of not less than 850° C. under the coexistence of calcium compounds, iron oxide particles or the like (Japanese Patent Application Laid-Open (KOAKI) No. 8-270924(1996)).

Further, there is known a method of burning wastes in an incinerator under the coexistence of ferric iron oxide hydroxide particles or iron oxide particles containing sulfur and sodium in not more than predetermined amounts (Japanese Patent Application Laid-Open (KOAKI) No. 9-89228(1997)).

However, although it has been desired to provide an iron oxide catalyst for inhibiting the generation of dioxin, which enables complete combustion of municipal solid wastes and decomposition of dioxin precursors in exiting intermittently operated incinerators such as mechanical batch incinerators or semi-continuous incinerators, and can prevent the generation of dioxin due to the memory effect upon low-temperature combustion at the start-up or shut-down of these incinerators, and a incineration process of a municipal solid waste using such a catalyst, the methods described in the specifications of the above Japanese KOKAIs or KOKOKU are still unsatisfactory.

Namely, in the method described in Japanese Patent Application Laid-Open (KOAKI) No. 4-371714(1992), dioxin generated, etc., are adsorbed onto the surface of porous cement at the bag filter portion. In this method, the dioxin is merely transferred from an exhaust gas to the cement. Therefore, this method fails to essentially inhibit the generation of dioxin. Further, it is necessary to conduct a treatment for converting the adsorbed dioxin into unharmful substances.

In the method described in Japanese Patent Publication (KOKOKU) No. 6-38863(1994), poly-halogenated cycloalkyl compounds and poly-halogenated aromatic compounds in fly ash generated in an incinerator are decomposed by catalysts such as iron oxide, calcium carbonate or sodium carbonate in a fixed bed. However, huge plant and equipment investment is required to construct a facility for converting the fly ash into unharmful substances, at a rear stage of the intermittently operated incinerator. Therefore, such a construction is almost impossible practically.

In particular, in the intermittently operated incinerators such as mechanical batch incinerators or semi-continuous incinerators, the start-up and shut-down operations have been inevitably repeated. Therefore, incomplete combustion tends to be caused due to low-temperature combustion upon the start-up and shut-down of the incinerators. In this case, it is known that dioxin tends to be generated due to the memory effect from dioxin precursors contained in unburned substances which are adhered onto flue or dust collector upon the shut-down operation of the previous day.

It is difficult to sufficiently remove dioxin by the conventional method of removing dioxin generated after passing through the dust collector (Japanese Patent Application Laid-Open (KOAKI) No. 6-38863(1994)) or the like. Further, in the incineration method of pre-mixing municipal solid wastes with iron oxide particles, etc., (Japanese Patent Application Laid-Open (KOAKI) No. 8-270924(1996)), in view of the structure of the incinerator used therein, it is difficult to inhibit the generation of dioxin at the flue or dust collector due to the memory effect upon low-temperature combustion at the start-up or shut-down of the incinerator.

Also, in the incineration method using iron oxide hydroxide particles or iron oxide particles containing sulfur or sodium in not more than a predetermined amount (Japanese Patent Application Laid-Open (KOAKI) No. 9-89228 (1997)), a sufficient catalytic activity of the iron oxide hydroxide particles or iron oxide particles can be exhibited at a high temperature at which the incinerator is operated at a steady state. However, under the low-temperature combustion condition upon the start-up of the intermittently operated incinerator, the conversion percentage of carbon monoxide into carbon dioxide at 250° C. is disadvantageously low, as shown in Comparative Example 1 hereinafter. As a result of the incineration test using such particles, the generation of dioxin due to the memory effect upon low-temperature combustion cannot be sufficiently inhibited, as shown in Comparative Example 3 hereinafter.

Thus, it is difficult to directly evaluate the dioxin-inhibiting effect by measuring the concentration of dioxin in the exhaust gas. Under this circumstance, in the course of studies concerning specific catalytic activities for obtaining an alternate method of evaluating the dioxin-inhibiting effect, it has been found that a close interrelation exists between the conversion percentage of carbon monoxide into carbon dioxide and the decomposition reaction of dioxin precursors. As a result, it has been found that the dioxin-inhibiting effect can be evaluated by the conversion percentage of carbon monoxide into carbon dioxide.

Further, it has been found that the generation of dioxin in the combustion chamber of the intermittently operated incinerator, can be inhibited by spray-adding an iron compound catalyst composed of iron oxide particles or iron oxide hydroxide particles, which is capable of exhibiting an excellent specific catalytic activity even under the low-temperature combustion condition, to the combustion chamber, and in addition, when these particles are retained in the flue or dust collector together with fly ash, it is possible to achieve not only complete combustion of municipal solid wastes but also decomposition of dioxin precursors contained in unburned substances remaining in the flue and dust collector, even under the low-temperature combustion condition upon the start-up or shut-down of the incinerator, thereby inhibiting the generation of dioxin due to the memory effect.

Furthermore, it has been found that by spray-adding specific iron oxide particles and/or specific iron oxide hydroxide particles having an average particle size of 0.01 to 2.0 $\mu$m and exhibiting a specific catalytic activity capable of converting carbon monoxide into carbon dioxide, as a catalyst for inhibiting generation of dioxin, in a specific amount into a combustion chamber of the intermittently operated incinerator by an air carrying method, it becomes possible to inhibit the generation of dioxin upon the low-temperature combustion. The present invention has been attained on the basis of the finding.

SUMMARY OF THE INVENTION

It is an object of the present invention to provide an iron compound catalyst for inhibiting the generation of dioxin, which enables not only complete combustion of municipal solid wastes but also decomposition of dioxin precursors in an intermittently operated municipal solid wastes incinerator such as mechanical batch incinerators or semi-continuous incinerators, and can prevent the generation of dioxin due to the memory effect upon the low-temperature combustion at the start-up or shut-down of the intermittently operated incinerator.

It is an another object of the present invention to provide a incineration process of a municipal solid waste in the presence of an iron compound catalyst for inhibiting the generation of dioxin, which enables not only complete combustion of municipal solid wastes but also decomposition of dioxin precursors in an intermittently operated incinerator such as mechanical batch incinerators or semi-continuous incinerators, and can prevent the generation of dioxin due to the memory effect upon the low-temperature combustion at the start-up or shut-down of the intermittently operated incinerator.

To accomplish the aim, in a first aspect of the present invention, there is provided an iron compound catalyst for inhibiting generation of dioxin, comprising iron oxide particles and/or iron oxide hydroxide particles having a catalytic activity capable of converting not less than 15% by volume of carbon monoxide into carbon dioxide when $2.8 \times 10^{-4}$ mol of iron oxide particles obtained by heat-treating the iron compound catalyst in air at a temperature of 800° C. for 15 minutes is instantaneously contacted with $6.1 \times 10^{-7}$ mol of carbon monoxide at a temperature of 250° C. and at a space velocity (Sv) of 42,400 $h^{-1}$ in an inert gas atmosphere using a pulse catalytic reactor, the iron oxide particles or said iron oxide hydroxide particles having an average particle size of 0.01 to 2.0 $\mu$m, a BET specific surface area of 0.2 to 200 $m^2$/g, a phosphorus content of not more than 0.02% by weight, a sulfur content of not more than 0.6% by weight and a sodium content of not more than 0.5% by weight.

In a second aspect of the present invention, there is provided an iron compound catalyst for inhibiting generation of dioxin, wherein said iron compound catalyst comprises aggregates comprising iron oxide particles, iron oxide hydroxide particles or mixed particles thereof having a catalytic activity capable of converting not less than 15% by volume of carbon monoxide into carbon dioxide when $2.8 \times 10^{-4}$ mol of iron oxide particles obtained by heat-treating said iron compound catalyst in air at a temperature of 800° C. for 15 minutes, are instantaneously contacted with $6.1 \times 10^{-7}$ mol of carbon monoxide at a temperature of 250° C. at a space velocity (SV) of 42,400 $h^{-1}$ in an inert gas atmosphere using a pulse catalytic reactor, said iron oxide particles or said iron oxide hydroxide particles having an average particle size of 0.01 to 2.0 μm, a BET specific surface area of 0.2 to 200 $m^2/g$, a phosphorus content of not more than 0.02% by weight, a sulfur content of not more than 0.6% by weight and a sodium content of not more than 0.5% by weight, and said aggregates having a specific surface area of not less than 1.0 $m^2/cm^3$ when measured under a feed pressure of 1 bar in a dry granulometer, and an average particle size ($D_{50}$) of 50% of a total volume thereof, of not more than 8.0 μm.

In a third aspect of the present invention, there is provided a incineration process of a municipal solid waste comprising:

spray-introducing an iron compound catalyst in an amount of 0.01 to 5.0% by weight per hour based on the weight of a dry municipal solid waste, into a combustion chamber of an intermittently operated incinerator by a gas carrying method to contact said iron compound catalyst with a combustion gas, the iron compound catalyst comprising iron oxide particles, iron oxide hydroxide particles or mixed particles thereof having a catalytic activity capable of converting not less than 15% by volume of carbon monoxide into carbon dioxide when $2.8 \times 10^{-4}$ mol of iron oxide particles obtained by heat-treating said iron compound catalyst in air at a temperature of 800° C. for 15 minutes, are instantaneously contacted with $6.1 \times 10^{-7}$ mol of carbon monoxide at a temperature of 250° C. at a space velocity (SV) of 42,400 $h^{-1}$ in an inert gas atmosphere using a pulse catalytic reactor, said iron oxide particles or said iron oxide hydroxide particles having an average particle size of 0.01 to 2.0 μm, a BET specific surface area of 0.2 to 200 $m^2/g$, a phosphorus content of not more than 0.02% by weight, a sulfur content of not more than 0.6% by weight and a sodium content of not more than 0.5% by weight.

In a fourth aspect of the present invention, there is provided a incineration process of a municipal solid waste comprising:

spray-introducing an iron compound catalyst in an amount of 0.01 to 5.0% by weight per hour based on the weight of a dry municipal solid waste, into a combustion chamber of an intermittently operated incinerator by a gas carrying method to contact said iron compound catalyst with a combustion gas, said iron compound catalyst comprising aggregates comprising iron oxide particles, iron oxide hydroxide particles or mixed particles thereof having a catalytic activity capable of converting not less than 15% by volume of carbon monoxide into carbon dioxide when $2.8 \times 10^{-4}$ mol of iron oxide particles obtained by heat-treating said iron compound catalyst in air at a temperature of 800° C. for 15 minutes, are instantaneously contacted with $6.1 \times 10^{-7}$ mol of carbon monoxide at a temperature of 250° C. at a space velocity (SV) of 42,400 $h^{-1}$ in an inert gas atmosphere using a pulse catalytic reactor, said iron oxide particles or said iron oxide hydroxide particles having an average particle size of 0.01 to 2.0 μm, a BET specific surface area of 0.2 to 200 $m^2/g$, a phosphorus content of not more than 0.02% by weight, a sulfur content of not more than 0.6% by weight and a sodium content of not more than 0.5% by weight, and said aggregates having a specific surface area of not less than 1.0 $m^2/cm^3$ when measured under a feed pressure of 1 bar in a dry granulometer, and an average particle size ($D_{50}$) of 50% of a total volume thereof, of not more than 8.0 μm.

In a fifth aspect of the present invention, there is provided a incineration process of a municipal solid waste comprising:

spray-introducing an iron compound catalyst in an amount of 0.01 to 5.0% by weight per hour based on the weight of a dry municipal solid waste, into a combustion chamber of an intermittently operated incinerator by a gas carrying method while supplying a secondary gas toward a tip end of a combustion flame in the combustion chamber of the intermittently operated incinerator to uniformly disperse said iron compound catalyst in the combustion chamber, thereby contacting said iron compound catalyst with a combustion gas, the iron compound catalyst comprising iron oxide particles, iron oxide hydroxide particles or mixed particles thereof having a catalytic activity capable of converting not less than 15% by volume of carbon monoxide into carbon dioxide when $2.8 \times 10^{-4}$ mol of iron oxide particles obtained by heat-treating said iron compound catalyst in air at a temperature of 800° C. for 15 minutes, are instantaneously contacted with $6.1 \times 10^{-7}$ mol of carbon monoxide at a temperature of 250° C. at a space velocity (SV) of 42,400 $h^{-1}$ in an inert gas atmosphere using a pulse catalytic reactor, said iron oxide particles or said iron oxide hydroxide particles having an average particle size of 0.01 to 2.0 μm, a BET specific surface area of 0.2 to 200 $m^2/g$, a phosphorus content of not more than 0.02% by weight, a sulfur content of not more than 0.6% by weight and a sodium content of not more than 0.5% by weight.

In a sixth aspect of the present invention, there is provided a incineration process of a municipal solid waste comprising:

spray-introducing an iron compound catalyst in an amount of 0.01 to 5.0% by weight per hour based on the weight of a dry municipal solid waste, into a combustion chamber of an intermittently operated incinerator by a gas carrying method while supplying a secondary gas toward a tip end of a combustion flame in the combustion chamber of the intermittently operated incinerator to uniformly disperse said iron compound catalyst in the combustion chamber, thereby contacting said iron compound catalyst with a combustion gas, said iron compound catalyst comprising aggregates comprising iron oxide particles, iron oxide hydroxide particles or mixed particles thereof having a catalytic activity capable of converting not less than 15% by volume of carbon monoxide into carbon dioxide when $2.8 \times 10^{-4}$ mol of iron oxide particles obtained by heat-treating said iron compound catalyst in air at a temperature of 800° C. for 15 minutes, are instantaneously contacted with 6.1×10$^{-7}$ mol of carbon monoxide at a temperature of 250° C. at a space velocity (SV) of 42,400 h$^{-1}$ in an inert gas atmosphere using a pulse catalytic reactor, said iron oxide particles or said iron oxide hydroxide particles having an average particle size of 0.01 to 2.0 μm a BET specific surface area of 0.2 to 200 m$^2$/g, a phosphorus content of not more than 0.02% by weight, a sulfur content of not more than 0.6% by weight and a sodium content of not more than 0.5% by weight, and said aggregates having a specific surface area of not less than 1.0 m$^2$/cm$^3$ when measured under a feed pressure of 1 bar in a dry granulometer, and an average particle size ($D_{50}$) of 50% of a total volume thereof, of not more than 8.0 μm.

In a seventh aspect of the present invention, there is provided a method of using an iron compound catalyst for inhibiting generation of dioxin, which iron compound catalyst comprises iron oxide particles, iron oxide hydroxide particles or mixed particles thereof having a catalytic activity capable of converting not less than 15% by volume of carbon monoxide into carbon dioxide when 2.8×10$^{-4}$ mol of iron oxide particles obtained by heat-treating said iron compound catalyst in air at a temperature of 800° C. for 15 minutes, are instantaneously contacted with 6.1×10$^{-7}$ mol of carbon monoxide at a temperature of 250° C. at a space velocity (SV) of 42,400 h$^{-1}$ in an inert gas atmosphere using a pulse catalytic reactor, said iron oxide particles or said iron oxide hydroxide particles having an average particle size of 0.01 to 2.0 μm, a BET specific surface area of 0.2 to 200 m$^2$/g, a phosphorus content of not more than 0.02% by weight, a sulfur content of not more than 0.6% by weight and a sodium content of not more than 0.5% by weight.

In an eighth aspect of the present invention, there is provided a method of using an iron compound catalyst for inhibiting generation of dioxin, comprising aggregates, which aggregates comprise iron oxide particles, iron oxide hydroxide particles or mixed particles thereof having a catalytic activity capable of converting not less than 15% by volume of carbon monoxide into carbon dioxide when 2.8×10$^{-4}$ mol of iron oxide particles obtained by heat-treating said iron compound catalyst in air at a temperature of 800° C. for 15 minutes, are instantaneously contacted with 6.1×10$^{-7}$ mol of carbon monoxide at a temperature of 250° C. at a space velocity (SV) of 42,400 h$^{-1}$ in an inert gas atmosphere using a pulse catalytic reactor, said iron oxide particles or said iron oxide hydroxide particles having an average particle size of 0.01 to 2.0 μm, a BET specific surface area of 0.2 to 200 m$^2$/g, a phosphorus content of not more than 0.02% by weight, a sulfur content of not more than 0.6% by weight and a sodium content of not more than 0.5% by weight, and said aggregates having a specific surface area of not less than 1.0 m$^2$/cm$^3$ when measured under a feed pressure of 1 bar in a dry granulometer, and an average particle size ($D_{50}$) of 50% of a total volume thereof, of not more than 8.0 μm.

DETAILED DESCRIPTION OF THE INVENTION

Figure 1:
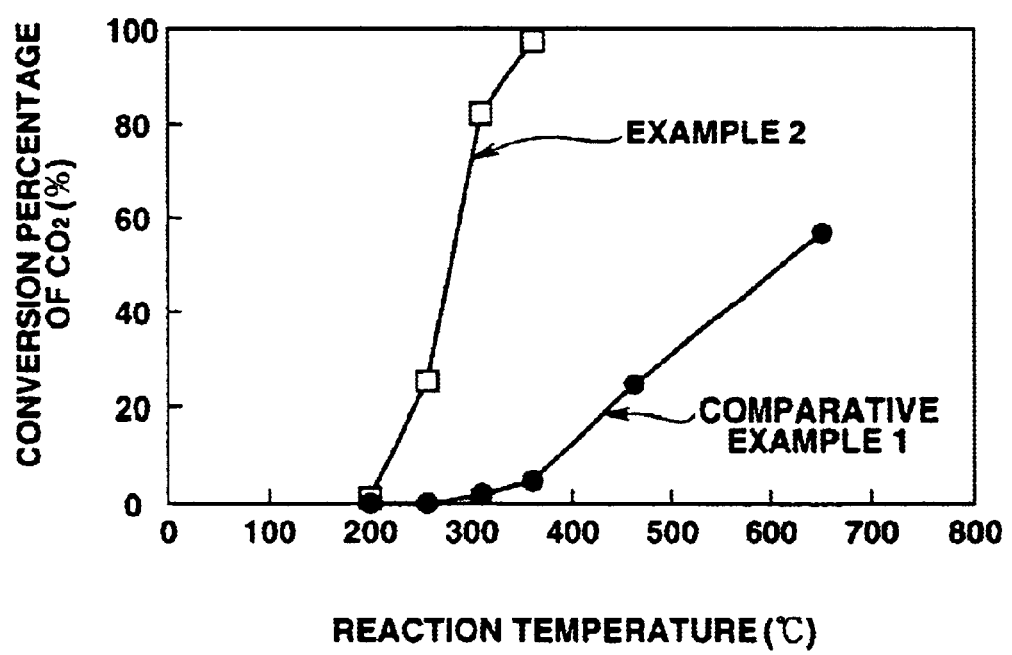
FIG. 1 is a graph showing a relationship between a conversion percentage of CO into $CO_2$, and a reaction temperature according to a specific evaluation method with respect to the iron compound catalysts for inhibiting the generation of dioxin obtained in Example 2 and the iron compound catalyst obtained in Comparative Example 1.

The present invention will now be described in detail below.

First, the iron compound catalyst for inhibiting the generation of dioxin according to the present invention, is described.

The iron compound catalyst for inhibiting the generation of dioxin according to the present invention, is composed of iron oxide particles and/or iron oxide hydroxide particles.

The iron oxide particles and/or iron oxide hydroxide particles of the present invention, have an average particle size of usually 0.01 to 2.0 μm. preferably 0.02 to 1.0 μm.

When the average particle size of the iron oxide particles and/or iron oxide hydroxide particles is less than 0.01 μm, these particles undergo abrupt sintering, etc., upon spray-adding to the incinerator, so that the particle size thereof is rather increased. Therefore, since such large-size particles cannot be transported along with a combustion gas to the flue, it becomes difficult to inhibit the generation of dioxin at a rear stage of the incinerator. On the other hand, when the average particle size of the iron oxide particles and/or iron oxide hydroxide particles is more than 2.0 μm, the particles cannot be sufficiently transported to the rear stage of the incinerator, e.g. to the flue along with a combustion gas, so that it is difficult to inhibit the generation of dioxin.

The iron oxide particles and/or iron oxide hydroxide particles according to the present invention, have a BET specific surface area of usually 0.2 to 200 m$^2$/g, preferably 0.5 to 200 m$^2$/g, more preferably 0.5 to 100 m$^2$/g.

As the iron oxide hydroxide particles usable in the present invention, there may be exemplified goethite, akaganeite, lepidocrocite or the like. As iron oxide particles usable in the present invention, there may be exemplified hematite, maghemite, magnetite or the like.

The iron oxide particles and/or iron oxide hydroxide particles according to the present invention, may have any particle shape such as granular shape, spherical shape, spindle shape, acicular shape or the like.

The iron oxide particles and/or iron oxide hydroxide particles according to the present invention, have a phosphorus content of usually not more than 0.02% by weight, preferably not more than 0.01% by weight, more preferably not more than 0.005% by weight. When the phosphorus content is more than 0.02% by weight, since the catalyst poison ability of the phosphorus become large, the oxidation activity for converting carbon monoxide into carbon dioxide is deteriorated, so that the generation of dioxin cannot be sufficiently inhibited.

The iron oxide particles and/or iron oxide hydroxide particles according to the present invention, have a sulfur content of usually not more than 0.6% by weight, preferably not more than 0.3% by weight, more preferably not more than 0.1% by weight. When the sulfur content is more than 0.6% by weight, since the catalyst poison ability of the sulfur become large, the oxidation activity for converting carbon monoxide into carbon dioxide is deteriorated, so that the generation of dioxin cannot be sufficiently inhibited.

The iron oxide particles and/or iron oxide hydroxide particles according to the present invention, have a sodium content of usually not more than 0.5% by weight, preferably not more than 0.3% by weight, more preferably not more than 0.2% by weight. When the sulfur content is more than 0.5% by weight, since the catalyst poison ability of the sodium become large, the oxidation activity for converting carbon monoxide into carbon dioxide is deteriorated, so that the generation of dioxin cannot be sufficiently inhibited.

The iron compound catalyst for inhibiting the generation of dioxin according to the present invention, can show such a catalytic activity capable of converting not less than 15% by volume, preferably not less than 18% by volume, more preferably not less than 20% by volume of carbon monoxide into carbon dioxide when $2.8 \times 10^{-4}$ mol of iron oxide particles obtained by heat-treating the iron compound catalyst in air at a temperature of 800° C. for 15 minutes, is instantaneously contacted with $6.1 \times 10^{-7}$ mol of carbon monoxide at a temperature of 250° C. and at a space velocity (SV) of 42,400 $h^{-1}$ in an inert gas atmosphere using a pulse catalytic reactor.

When the conversion percentage of carbon monoxide into carbon dioxide is less than 15% by volume, since the catalytic activity thereof is lower, the generation of dioxin can not be sufficiently inhibited.

Next, the process for producing the iron compound catalyst for inhibiting the generation of dioxin according to the present invention, is described.

Among the iron compound catalysts for inhibiting the generation of dioxin according to the present invention, the goethite particles may be produced by passing an oxygen-containing gas such as air through a suspension containing a ferrous iron-containing precipitate such as hydroxides of iron or iron carbonates which are obtained, for example, by reacting a ferrous salt with at least one compound selected from the group consisting of alkali hydroxides, alkali carbonates and ammonia.

As the ferrous salts, there may be exemplified ferrous nitrate, ferrous acetate, ferrous oxalate, ferrous sulfate or the like. Among these ferrous salts, those which do not contain phosphorus or sulfur as catalyst poison, such as ferrous nitrate, ferrous acetate or ferrous oxalate, are preferred. In the case where ferrous sulfate is used as the ferrous salt, it is necessary to subject the obtained goethite particles to purification treatments such as sufficient washing with water, etc., in order to remove sulfur as catalyst poison therefrom.

As the alkali hydroxides, there may be exemplified sodium hydroxide, potassium hydroxide, calcium hydroxide, magnesium hydroxide or the like.

As the alkali carbonates, there may be exemplified sodium carbonate, potassium carbonate or the like.

Among the iron compound catalysts for inhibiting the generation of dioxin according to the present invention, the hematite particles may be produced, for example, by heat-dehydrating or heat-treating the above obtained goethite particles at a temperature of 200 to 800° C. in air; the magnetite particles may be produced, for example, by heat-reducing the above obtained hematite particles at a temperature of 300 to 600° C. in a reducing atmosphere; and the maghemite particles may be produced, for example, by heat-oxidizing the above obtained magnetite particles in a temperature of 200 to 600° C. in air.

In the production of the iron compound catalyst for inhibiting the generation of dioxin according to the present invention, it is necessary to restrict the contents of phosphorus, sulfur and sodium as catalyst poisons to not more than predetermined amounts. More specifically, the contents of phosphorus, sulfur and sodium are required to be reduced by avoiding the use of sodium hexametaphosphate usually added as a sintering preventive upon heat-calcination step, and by removing sulfur ions derived from raw ferrous materials or sodium ions derived from the alkali hydroxides or the alkali carbonates by means of purification treatments such as washing with water or the like.

In the production of the iron compound catalyst for inhibiting the generation of dioxin according to the present invention, since aggregates composed of iron oxide particles and/or iron oxide hydroxide particles are inevitably produced, it is required to subject a raw massive material to pulverization treatment for obtaining such aggregates having a predetermined specific surface area and a predetermined average particle size. The pulverization treatment may be conducted by using a dry pulverizer such as a sand mill, a pin-type mill or a hammer mill.

The aggregates according to the present invention, have a specific surface area of usually not less than 1.0 $m^2/cm^3$, preferably not less than 1.2 $m^2/cm^3$ when measured under a feed pressure of 1 bar in a dry granulometer.

When the specific surface area of the aggregates is less than 1.0 $m^2/cm^3$, the efficiency of contact between the aggregates and the combustion gas in the incinerator becomes deteriorated, so that it is difficult to inhibit the generation of dioxin to a sufficient extent.

In addition, the aggregates according to the present invention, have an average particle size ($D_{50}$) of 50% of a total volume thereof, of usually not more than 8.0 $\mu$m, preferably not more than 7.0 $\mu$m. When the average particle size ($D_{50}$) is more than 8.0 $\mu$m, the efficiency of contact between the aggregates and the combustion gas in the incinerator becomes deteriorated, so that it is difficult to inhibit the generation of dioxin to a sufficient extent.

Next, the incineration process of a municipal solid waste using the iron compound catalyst for inhibiting the generation of dioxin according to the present invention, is described.

The incinerators to which the present invention may be applied, include intermittently operated incinerators such as mechanical batch incinerators or semi-continuous incinerators.

The municipal solid wastes to be treated according to the present invention, may include ordinary municipal solid wastes. This is because a large amount of dioxin tends to be generated especially by incomplete combustion of ordinary combustible wastes upon incineration thereof.

The addition of the iron compound catalyst for inhibiting the generation of dioxin according to the present invention, may be conducted by spray-adding the iron compound catalyst over the municipal solid wastes by a gas carrying method. The spray-adding of the iron compound catalyst may be conducted through two or more portions. In the case where the iron compound catalyst is directly mixed with the municipal solid wastes, the iron compound catalyst cannot be sufficiently contacted with the combustion gas or fly ash. As a result, the iron compound catalyst cannot be adhered onto or retained in the flue or dust collector provided in a rear stage of the incinerator, thereby failing to sufficiently inhibit the generation of dioxin.

As the gas carrying methods, there may be used an air carrying method, a nitrogen gas carrying method or the like. The amount of the gas spray-added per one portion is usually 1 to 20% by volume, preferably 1 to 15% volume, more preferably 4 to 15% by volume based on a total volume of a combustion air supplied to the combustion chamber of the incinerator. When the amount of the gas spray-added is more than 20% by volume, the temperature of the incinerator is decreased by adverse influence of the temperature of the gas, so that it becomes difficult to accomplish complete combustion of the municipal solid wastes. On the other hand, when the amount of the gas spray-added is less than 1% by volume, the iron compound catalyst for inhibiting the generation of dioxin according to the present invention, cannot be stably supplied to the combustion chamber.

The iron compound catalyst for inhibiting the generation of dioxin according to the present invention, may have any shape, e.g., in the form of particles or a slurry. Among them, particles are preferred.

The amount of the iron compound catalyst added is usually 0.01 to 5.0% by weight, preferably 0.05 to 3.0% by weight, more preferably 0.1 to 1.0% by weight based on the weight of dry municipal solid wastes incinerated per hour.

When the amount of the iron compound catalyst added is less than 0.01% by weight, a sufficient effect of inhibiting the generation of dioxin cannot be obtained. On the other hand, when the amount of the iron compound catalyst added is more than 5.0% by weight, there tends to be caused such a disadvantage that a dust collector become overloaded and the combustion temperature become lowered temporarily.

The combustion temperature of the incineration process using the iron compound catalyst for inhibiting the generation of dioxin according to the present invention, is 800 to 1,200° C., preferably 900 to 1,000° C. under a steady operation of the incinerator.

Meanwhile, at the start-up or shut-down, the incinerator is operated at a temperature between room temperature and the combustion temperature during the steady operation. In this case, incomplete combustion of the municipal solid wastes tends to be caused. Therefore, it is preferred that the spray-addition of the iron compound catalyst for inhibiting the generation of dioxin according to the present invention, is conducted over a whole period between the initial star-up and the final shut-down at which a large amount of dioxin tends to be generated.

The incineration process of a municipal solid waste according to the present invention, preferably comprises the steps of spray-adding an iron compound catalyst for inhibiting the generation of dioxin, to a combustion chamber of an intermittently operated incinerator by a gas carrying method, while supplying a secondary gas a tip end of combustion flame therein in order to uniformly disperse the iron compound catalyst in the incinerator to contact the iron compound catalyst with a combustion gas.

As the supplied secondary gas used in the present invention, there may be used air, nitrogen, a combustion exhaust gas or the like.

The position at which the secondary gas is supplied, is preferably near to a tip end of combustion flame in the combustion chamber. The secondary gas may be optionally supplied through not less than two portions of the combustion. In general, since it is most difficult to mix an unburned gas existing near the tip end of combustion flame, with an oxygen-rich gas, the secondary gas is preferably supplied in such a direction, resulting in good mixing efficiency of these gases. Also, the supplying of the secondary gas enables the iron compound catalyst to be homogeneously mixed and dispersed in the incinerator and, therefore, efficiently come into contact with the unburned gas.

In the case where the secondary gas is supplied toward portions other than the tip end of combustion flame, the unburned gas cannot be sufficiently mixed with the oxygen-rich gas, and it becomes difficult to sufficiently disperse the iron compound catalyst in the incinerator.

The amount of the gas supplied is usually 1 to 40% by volume, preferably 1 to 20% by volume, more preferably 4 to 20% by volume based on the total volume of a combustion air supplied to the combustion chamber. When the amount of the secondary gas supplied is more than 40% by volume, the temperature of the incinerator may be decreased by adverse influence of the temperature of the gas, so that it becomes difficult to achieve complete combustion of the municipal solid wastes. On the other hand, when the amount of the gas supplied is less than 1% by volume, it may be difficult of disperse uniformly the iron compound catalyst for inhibiting the generation of dioxin according to the present invention in the incinerator.

The supply of the secondary gas in the present invention, is preferred to uniformly disperse the iron compound catalyst spray-added to the combustion chamber in the incinerator, thereby inhibiting the generation of dioxin in the combustion chamber.

Figure 2:
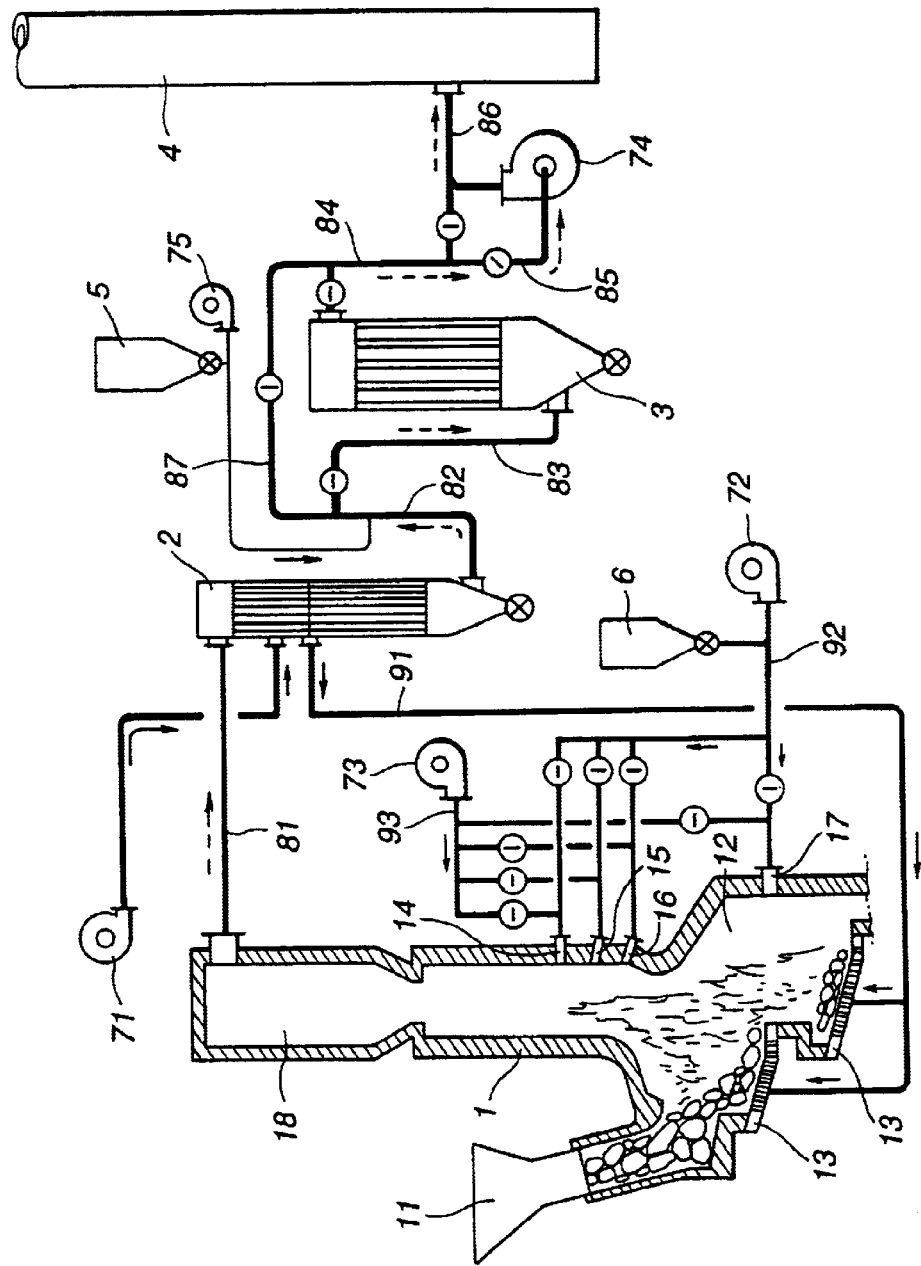
FIG. 2 shows a schematic view of an intermittently operated incinerator used in the present invention.

The incineration process of a municipal solid waste using the catalyst and supplying a secondary gas toward a tip end of combustion flame in the combustion chamber according to the present invention is explained referring to FIG. 2 shown a schematic view of an intermittently operated incinerator used in the present invention. In FIG. 2, reference numeral 1 denotes a incinerator, 2: air preheater, 3: bag filter, 4: flue, 5: tank for hydrogen chloride gas-eliminating agent, 6: feed tank for iron compound catalyst, 11: a municipal solid waste hopper, 12: combustion chamber, 13: feed ports for combustion air, 14 to 17: feed ports for secondary gas or supplementary combustion burner port, 18: gas-cooling chamber, 71: forced draft fan, 72: blower for supplying iron compound catalyst, 73: blower for supplying secondary gas, 74: induced draft fan, 75: blower for supplying hydrogen chloride gas-eliminating agent, 81 to 86: gas duct, 91: combustion air duct, 92: iron compound catalyst duct, and 93: secondary gas duct.

Meanwhile, in some kinds of incinerators, an upper portion of the combustion chamber 12 of the incinerator 1 has an elongated shape, so that a wide space portion is formed between the combustion chamber 12 and the gas-cooling chamber 18. The wide space portion is sometimes called a "re-combustion chamber" or a "secondary combustion chamber" to distinguish these chambers from the combustion chamber 12. In the present invention, however, the re-combustion chamber or the secondary combustion chamber is included in the combustion chamber 12.

The combustion chamber 12 of the incinerator 1 is provided with the feed ports for combustion air 13, and the feed ports or supplementary combustion burner port 14 to 17. The amount of the combustion air 13 is 1.5 to 3.5 times by volume the theoretical air quantity for complete combustion.

The dry municipal solid wastes are charged into an incinerator 1 through the municipal solid waste hopper 11. The iron compound catalyst for inhibiting the generation of dioxin is supplied through the supplementary combustion burner port 17 disposed near the bottom of the combustion chamber 12 or the feed ports 14 to 16, by means of the iron compound catalyst duct 92 and blower for supplying iron compound catalyst 72 from the tank for hydrogen chloride gas-eliminating agent 6. The secondary gas is supplied at a tip end of a combustion flame in the combustion chamber through the feed ports 14, 15 or 16 by a gas carrying method, for example, by means of the secondary gas duct 93 and blower for supplying secondary gas 73.

After cooling the combustion gas in the gas-cooling chamber 18, the combustion gas is fed to the dust collector 3 (bag filter) through the gas duct 81, the air preheater 2, the gas ducts 82 and 83. Then, the combustion gas is released in air through the gas ducts 84 and 85, the induced draft fan 74, the gas duct 86, and the flue 4.

In addition, the hydrogen chloride gas-eliminating agent is supplied into the gas duct 82 from the tank 5 by means of the blower for supplying hydrogen chloride gas-eliminating agent 75 in order to scavenge hydrogen chloride.

Upon incineration of the municipal solid wastes in an intermittently operated incinerator, it is required that after the iron compound catalyst for inhibiting the generation of dioxin according to the present invention is spray-added to the combustion chamber, not only the generation of dioxin in the combustion chamber can be inhibited, but also the iron compound catalyst is adhered to flue and retained in dust collector which are provided at a rear stage of the incinerator, along with the combustion gas or fly ash, thereby preventing the generation of dioxin due to the memory effect upon low-temperature combustion at the start-up or shut-down of the incinerator.

Namely, as described hereinafter, the complete combustion of the municipal solid wastes and decomposition of dioxin precursors can be accelerated by causing the iron compound catalyst to co-exist together with unburned substances remaining within the dust collector, so that it is possible to inhibit the re-synthesis of dioxin therein.

By conducting the incineration process according to the present invention, upon the start-up of the incinerator, the concentration of dioxin in the combustion exhaust gas can be reduced to usually not more than 10 ngTEQ/Nm$^3$, preferably not more than 8.0 ngTEQ/Nm$^3$, more preferably not more than 6.0 ngTEQ/Nm$^3$. In addition, during the steady operation of the incinerator, the concentration of dioxin in the combustion exhaust gas can be reduced to usually not more than 8.0 ngTEQ/Nm$^3$, preferably not more than 6.0 ngTEQ/Nm$^3$, more preferably not more than 5.0 ngTEQ/Nm$^3$.

Further, in case of supplying a secondary gas toward a tip end of combustion flame in the combustion chamber in order to uniformly disperse the iron compound catalyst for inhibiting the generation of dioxin in the incinerator, thereby contacting the iron compound catalyst with a combustion gas, upon the start-up of the incinerator, the concentration of dioxin in the combustion exhaust gas can be reduced to usually not more than 8.0 ngTEQ/Nm$^3$, preferably not more than 6.0 ngTEQ/Nm$^3$, more preferably not more than 5.0 ngTEQ/Nm$^3$, still more preferably not more than 3.5 ngTEQ/Nm$^3$, most preferably not more than 3.0 ngTEQ/Nm$^3$ and in addition, during the steady operation of the incinerator, the concentration of dioxin in the combustion exhaust gas can be reduced to usually not more than 6.0 ngTEQ/Nm$^3$, preferably not more than 5.0 ngTEQ/Nm$^3$, more preferably not more than 4.0 ngTEQ/Nm$^3$, still more preferably not more than 3.0 ngTEQ/Nm$^3$, most preferably not more than 2.5 ngTEQ/Nm$^3$.

Further, by conducting the incineration process according to the present invention, upon the start-up of the incinerator, the concentration of carbon monoxide in the combustion exhaust gas can be reduced to not more than 120 ppm, preferably not more than 100 ppm, more preferably not more than 80 ppm. In addition, during the steady operation of the incinerator, the concentration of carbon monoxide in the combustion exhaust gas can be reduced to not more than 50 ppm, preferably not more than 40 ppm, more preferably not more than 30 ppm.

Further, in case of supplying a secondary gas toward a tip end of combustion flame in the combustion chamber in order to uniformly disperse the iron compound catalyst for inhibiting the generation of dioxin in the incinerator, thereby contacting the iron compound catalyst with a combustion gas, upon the start-up of the incinerator, the concentration of carbon monoxide in the combustion exhaust gas can be reduced to usually not more than 100 ppm, preferably not more than 80 ppm, more preferably not more than 60 ppm, still more preferably not more than 50 ppm, most preferably not more than 25 ppm and in addition, during the steady operation of the incinerator, the concentration of carbon monoxide in the combustion exhaust gas can be reduced to usually not more than 40 ppm, preferably not more than 30 ppm, more preferably not more than 25 ppm, still more preferably not more than 15 ppm.

Also, by conducting the incineration process according to the present invention, upon the start-up of the incinerator, the concentration of hydrogen chloride in the combustion exhaust gas can be reduced to not more than 60 ppm, preferably not more than 50 ppm, more preferably not more than 30 ppm. In addition, during the steady operation of the incinerator, the concentration of hydrogen chloride in the combustion exhaust gas can be reduced to not more than 40 ppm, preferably not more than 30 ppm, more preferably not more than 20 ppm.

In accordance with the present invention, by spray-adding an iron compound catalyst composed of iron oxide particles and/or iron oxide hydroxide particles having a specific catalyst property capable of exhibiting an excellent catalytic activity even upon low-temperature combustion, to a combustion chamber of an intermittently operated incinerator by a gas carrying method and optionally supplying a secondary gas toward a tip end of combustion flame in the combustion chamber in order to uniformly disperse the iron compound catalyst for inhibiting the generation of dioxin in the incinerator to contact the iron compound catalyst with a combustion gas, it becomes possible to inhibit the generation of dioxin in the combustion chamber. Further, by retaining the iron compound catalyst in the flue or dust collector along with fly ash, it becomes possible to decompose dioxin precursors contained in unburned substances remaining in the flue or dust collector even under the low-temperature combustion condition at the start-up or shut-down of the incinerator, thereby inhibiting the generation of dioxin due to the memory effect.

The reason why the iron compound catalyst according to the present invention can exhibit the effect of inhibiting the generation of dioxin, is considered as follows. That is, it is considered that the generation of dioxin due to the memory effect upon the low-temperature combustion at the start-up or shut-down of the intermittently operated incinerator, becomes remarkable when the temperature reaches about 250° C. Since the iron compound catalyst according to the present invention shows a conversion percentage of carbon monoxide into carbon dioxide as high as not less than 15% at a temperature of 250° C., there can be obtained an excellent effect of inhibiting the generation of dioxin.

Further, it is considered that the excellent catalytic activity of the iron compound catalyst according to the present invention can also be obtained by reducing the content of each catalyst poison to not more than the specific value, for example, reducing the contents of phosphorus, sulfur and sodium as catalyst poisons to not more than 0.02% by weight, not more than 0.6% by weight and not more than 0.5% by weight, respectively.

In addition, the reason why the effect of inhibiting the generation of dioxin can be enhanced by supplying the secondary gas, is considered as follow. That is, the iron compound catalyst spray-added by a gas carrying method, can be uniformly mixed and dispersed in the incinerator by supplying the secondary gas and, therefore, can be sufficiently contacted with unburned gases and oxygen-rich gases, so that the complete combustion of the municipal solid wastes and decomposition of the dioxin precursors can be effectively conducted.

That is, in case of supplying a secondary gas toward a tip end of combustion flame, the generation of dioxin can be more effectively. The unburned gas and the oxygen-rich gas are intimately mixed together by supplying the secondary gas toward the tip end of combustion flame, and the iron compound catalyst for inhibiting the generation of dioxin which shows the specific catalytic activity, is uniformly mixed and dispersed in the incinerator by supplying the iron compound catalyst by the gas carrying method, so that it is possible to more efficiently contact the unburned gas and the oxygen-rich gas which are sufficiently mixed together by the secondary gas, with the iron compound catalyst and react these gases with each other, thereby accelerating complete combustion of the unburned gas and decomposition of dioxin precursors.

Further, by inhibiting the generation of dioxin in the combustion chamber and causing the iron compound catalyst to be retained in flues and dust collector together with fly ash, the dioxin precursors contained in unburned substances which still remain in the flues and the dust collector, can be decomposed even upon low-temperature combustion at the start-up and shut-down operations of the incinerator, whereby it is possible to more effectively prevent the generation of dioxin due to the memory effect.

In accordance with the present invention, by using an iron compound catalyst for inhibiting the generation of dioxin having a high catalytic activity, in the incineration of the municipal solid wastes in an intermittently operated incinerator such as mechanical batch incinerators or semi-continuous incinerators, complete combustion of the municipal solid wastes and decomposition dioxin precursors can be achieved, thereby inhibiting the generation of dioxin due to the memory effect upon the low-temperature combustion at the start-up or shut-down of the incinerator.

Further, in accordance with the present invention, in the incineration of the municipal solid wastes in an intermittently operated incinerator such as mechanical batch incinerators or semi-continuous incinerators, by spray-adding an iron compound catalyst for inhibiting the generation of dioxin having a high catalytic activity to a combustion chamber by a gas carrying method, and simultaneously supplying a gas, it becomes possible to achieve complete combustion of the municipal solid wastes and decomposition of dioxin precursors, thereby inhibiting the generation of dioxin due to the memory effect upon the low-temperature combustion at the start-up or shut-down of the incinerator.

EXAMPLES

The present invention will now be described in more detail with reference to the following examples and comparative examples, but the present invention is not restricted to those examples and various modifications are possible within the scope of the invention.

The properties in the examples were measured by the following methods.

(1) The average particle size of iron compound particles was expressed by the value measured from an electron micrograph.

(2) The specific surface area was expressed by the value measured by a BET method.

(3) The contents of phosphorus and sodium contained in iron compound particles were expressed by the values measured by an inductively coupled plasma atomic emission spectrometer (SPS-4000 Model, manufactured by Seiko Denshi Kogyo Co., Ltd.).

(4) The content of sulfur contained in iron compound particles were expressed by the value measured by a Carbon-Sulfur Analyzer (EMIA-2200 Model, manufactured by Horiba Seisakusho Co., Ltd.).

(5) As to catalyst property of the iron compound catalyst for inhibiting the generation of dioxin, the catalytic activity was expressed by a conversion percentage of carbon monoxide into carbon dioxide by measuring the concentration of carbon dioxide produced when $2.8 \times 10^{-4}$ mol of iron oxide particles ($\alpha$-$Fe_2O_3$) obtained by heat-treating the iron compound catalyst in air at a temperature of 800° C. for 15 minutes, were instantaneously contacted with $6.1 \times 10^{-7}$ mol of carbon monoxide at a temperature of 250° C. at an SV of 42,400 $h^{-1}$ in an inert gas atmosphere using a pulse catalytic reactor.

Here, the "SV" means a space velocity, and is expressed by the value obtained by dividing a flow rate of the reaction gas by a volume of the catalyst. The SV is represented by an inverse number of time ($h^{-1}$).

The pulse catalytic reactor used comprises a reactor portion and a gas chromatography portion which is constituted by Gas Chromatography GC-16A (manufactured by Shimazu Seisakusho Co., Ltd.).

The evaluation method used herein was conducted by referring to methods described in the literatures (e.g., R. J. Kobes, et al, "J. Am. Chem. Soc.", 77, 5860(1955) or "Experimental Chemistry II-Reaction and Velocity" edited by Japan Chemistry Institute and published by Maruzen, Tokyo (1993)).

(6) The concentration of dioxin in the combustion exhaust gas was expressed by the value measured by the method approved by Waste Matter Research Foundation (Tokyo Japan).

(7) The concentration of hydrogen chloride in the combustion exhaust gas was expressed by the value measured by absorbing the combustion exhaust gas passed through a gas flowmeter, into a cleaning bottle filled with water, and then analyzing the obtained aqueous hydrochloric acid solution in the cleaning bottle by a chromatography.

(8) The carbon monoxide concentration in the combustion exhaust gas was expressed by the value measured by passing a combustion exhaust gas through nondispersive infrared spectrophotometer APMA-3500 Model (manufactured by Horiba Seisakusho Co., Ltd.).

(9) The specific surface area of aggregates and the average particle size ($D_{50}$) of 50% of a total volume thereof were measured by a laser diffraction-type granulometer: HELOS & RODOS (tradename, manufactured by Nippon Denshi Co., Ltd.).

Example 1
<Production of Iron Compound Catalyst>

126 liters of a 0.4N aqueous sodium hydroxide solution was charged into a reactor maintained under a non-oxidative atmosphere by passing a nitrogen gas therethrough. Next, 12 liters of an aqueous ferrous nitrate solution containing $Fe^{2+}$ in an amount of 1.5 mol/liter (the amount of alkali was 1.4 equivalents based on the ferrous iron ($Fe^{2+}$)) was added to the reactor, and then heated to 47° C. After the contents of the reactor were mixed with each other at 47° C. for 120 minutes while stirring, air was passed therethrough at flow rate of 70 liters/min for 6.0 hours, thereby producing goethite particles. Thereafter, the obtained goethite particles were successively subjected to filtration, washing with water, drying and pulverization, thereby obtaining aggregates composed of goethite particles.

The thus obtained goethite particles had an average particle size of 0.24 μm, a phosphorus content of 0.002% by weight, a sulfur content of 0.05% by weight and a sodium content of 0.08% by weight, and the conversion percentage of carbon monoxide into carbon dioxide at a temperature of 250° C. according to the above specified evaluation method was 20%.

Further, the obtained aggregates composed of the goethite particles had a specific surface area of 2.58 $m^2/cm^3$ when measured under a feed pressure of 1 bar in a dry granulometer, and an average particle size ($D_{50}$) of 50% of a total volume thereof, of 3.19 μm.

Examples 2 to 5, Comparative Examples 1 to 2 and Reference Examples 1 to 2

<Production of Iron Compound Catalyst>

The same procedure as defined in Example 1 was conducted except that kind of the ferrous salt, kind of the alkali, the equivalent ratio, the reaction temperature, use or non-use of the heat-treatment, the heat-treatment temperature and the pulverization method, were varied, thereby obtaining an iron compound catalyst.

Various properties of the obtained iron compound catalyst are shown in Table 1.

In FIG. 1, there is shown a relationship between the conversion percentage of carbon monoxide into carbon dioxide according to the above-specified evaluation method, and the reaction temperature with respect to the iron compound catalysts obtained in Example 2 and Comparative Example 1.

In the intermittently operated incinerator, in order to inhibit the generation of dioxin due to the memory effect upon low-temperature combustion at the start-up or shut-down thereof, it is required that the conversion percentage of carbon monoxide into carbon dioxide is at least 15% at a temperature of about 250° C. at which the amount of dioxin generated is abruptly increased. In the case where the iron compound catalyst obtained in Example 2 was used, a sufficient effect of inhibiting the generation of dioxin could be obtained. On the other hand, when the iron compound catalyst obtained in Comparative Example 1 (used in Example 1 of Japanese Patent Application Laid-open (KOKAI) No. 9-89228) was used, a similar effect by the catalytic activity of the iron compound catalyst could be obtained only at a temperature as high as about 450° C. Accordingly, it is apparent that the generation of dioxin due to the memory effect upon low-temperature combustion cannot be inhibited by the use of the conventional iron compound catalyst.

Example 6

<Municipal Solid Waste Incineration Test>

Dry municipal solid wastes were charged into a stoker-type mechanical batch incinerator (incineration capacity of municipal solid waste when operated for 8 hours a day: 6 tons per day). Further, the goethite particles obtained in Example 1 were spray-added into a combustion chamber 12 of the mechanical batch incinerator through the feed port 14 (in FIG. 2) in an amount of 0.5% by weight per hour based on the weight of the dry municipal solid wastes, by an air carrying method. The amount of air sprayed was 3 $m^3$/min (6.7% by volume based on the volume of the combustion air). The spray-addition of the goethite particles was continued for 8 hours, namely, from the start-up through the steady operation up to the shut-down of the mechanical batch incinerator.

The measurement for each concentration of exhaust gases such as dioxin was conducted two times, i.e., upon the start-up and during the steady operation of the incinerator, at an outlet of a dust collector (bag filter).

The amount of dioxin generated upon the start-up was 4.3 ngTEQ/$Nm^3$, the amount of hydrogen chloride generated thereupon was 24 ppm, and the amount of carbon monoxide generated thereupon was 53 ppm.

Also, the amount of dioxin generated upon the steady operation was 4.1 ngTEQ/$Nm^3$, the amount of hydrogen chloride generated thereupon was 17 ppm, and the amount of carbon monoxide generated thereupon was 21 ppm.

As a blank test, the incinerator was similarly operated without addition of the combustion catalyst, etc., thereby measuring each concentration of the exhaust gases.

In the blank test, the amount of dioxin generated upon the start-up was 35 ngTEQ/$Nm^3$, the amount of hydrogen chloride generated thereupon was 240 ppm, and the amount of carbon monoxide generated thereupon was 282 ppm.

Also, in the blank test, the amount of dioxin generated upon the steady operation was 19 ngTEQ/$Nm^3$, the amount of hydrogen chloride generated thereupon was 209 ppm, and the amount of carbon monoxide generated thereupon was 121 ppm.

As a result, it was recognized that the generation of dioxin due to the memory effect upon the low-temperature combustion of the incinerator, was effectively prevented by the incineration process of the municipal solid waste of using the iron compound catalyst for inhibiting the generation of dioxin according to the present invention.

Example 7

<Municipal Solid Waste Incineration Test>

In FIG. 2, dry municipal solid wastes were charged into a stoker-type mechanical batch incinerator 1 (incineration capacity of municipal solid waste when operated for 8 hours a day: 6 tons per day). Further, the goethite particles obtained in Example 1 were spray-added into a combustion chamber 12 of the mechanical batch incinerator through the feed port 14 in an amount of 0.5% by weight per hour based on the weight of the dry municipal solid wastes, by an air carrying method. The amount of air sprayed was 3 $m^3$/min (6.7% by volume based on the volume of the combustion air), and the spray-addition of the goethite particles was continued for 8 hours, namely, from the start-up through the steady operation up to the shut-down of the mechanical batch incinerator 1. Simultaneously, air as the secondary gas was supplied into the combustion chamber 12 through the feed port 16 at a feed rate of 3 $m^3$/min (6.7 volume % based on the volume of the combustion chamber), upon which the air was directed to a tip end of combustion flame.

The measurement for each exhaust gas such as dioxin was conducted two times, i.e., upon the start-up and during the steady operation of the incinerator, for 4 hours at an outlet of a dust collector 3 (bag filter). The result of each measurement was expressed by an average of the measured values.

The amount of dioxin generated upon the start-up was 2.3 ngTEQ/$Nm^3$, the amount of hydrogen chloride generated thereupon was 20 ppm, and the amount of carbon monoxide generated thereupon was 19 ppm. Also, the amount of dioxin generated upon the steady operation was 1.9 ngTEQ/$Nm^3$, the amount of hydrogen chloride generated thereupon was 15 ppm, and the amount of carbon monoxide generated thereupon was 8 ppm.

As a result, it was recognized that by conducting the incineration process of municipal solid waste of feeding a secondary air to a tip end of combustion flame in the combustion chamber, and using the iron compound catalyst for inhibiting the generation of dioxin according to the present invention, the complete combustion of the municipal solid wastes and decomposition of dioxin precursors were accomplished and the generation of dioxin due to a memory effect was more effectively prevented, upon the low-temperature combustion of the incinerator.

Examples 8 to 11 and Comparative Examples 3 to 7

<Municipal Solid Waste Incineration Test>

The same procedure for the municipal solid waste incineration test as defined in Example 6 was conducted except that kind and amount of the iron compound catalyst added, the addition method, the addition positions or the like were varied.

Various conditions and results of the respective incineration tests are shown in Table 2.

Example 12

The same procedure for the municipal solid waste incineration test as defined in Example 7 was conducted except that kind and amount of the iron compound catalyst added, the addition method, the addition positions or the like were varied.

Various conditions and results of the respective incineration tests are shown in Table 2.

TABLE 1

| Examples and Comparative Examples | Production conditions of iron compound catalyst for inhibiting generation of dioxin | | |
|---|---|---|---|
| | Kind of ferrous salt | Kind of alkali | Equivalent ratio of alkali to ferrous iron |
| Example 1 | Ferrous sulfate | Sodium hydroxide | 1.4 |
| Example 2 | Ferrous sulfate | Sodium carbonate | 2.0 |
| Example 3 | Ferrous sulfate | Sodium carbonate | 1.1 |
| Example 4 | Ferrous sulfate | Sodium hydroxide | 1.4 |
| Example 5 | Ferrous sulfate | Sodium hydroxide | 1.8 |
| Comparative Example 1 | Ferrous sulfate | Sodium carbonate | 2.0 |
| Comparative Example 2 | Ferrous sulfate | Sodium hydroxide | 2.1 |
| Reference Example 1 | Ferrous sulfate | Sodium hydroxide | 1.4 |
| Reference Example 2 | Ferrous sulfate | Sodium hydroxide | 1.4 |

| Examples and Comparative Examples | Production conditions of iron compound catalyst for inhibiting generation of dioxin | | | |
|---|---|---|---|---|
| | Reaction temperature (° C.) | Heat-dehydrating temperature (° C.) | Heat-reducing temperature (° C.) | Heat-oxidizing temperature (° C.) |
| Example 1 | 47 | — | — | — |
| Example 2 | 43 | — | — | — |
| Example 3 | 48 | — | — | — |
| Example 4 | 43 | 500 | — | — |
| Example 5 | 48 | 300 | 400 | 350 |
| Comparative Example 1 | 45 | — | — | — |
| Comparative Example 2 | 49 | — | — | — |
| Reference Example 1 | 47 | — | — | — |
| Reference Example 2 | 47 | — | — | — |

TABLE 1-continued

| Examples and Comparative Examples | Production conditions of iron compound catalyst for inhibiting generation of dioxin | Properties of iron compound catalyst for inhibiting generation of dioxin | |
|---|---|---|---|
| | Pulverization method | Kind | Average particle size ($\mu$m) |
| Example 1 | Sand mill (40 kg/cm, 60 min) | Goethite particles | 0.25 |
| Example 2 | Sand mill (40 kg/cm, 60 min) and then pin-type mill (peripheral speed: 45 m/sec) | Goethite particles | 0.25 |
| Example 3 | Pin-type mill (peripheral speed: 45 m/sec) | Goethite particles | 0.25 |
| Example 4 | Pin-type mill (peripheral speed: 45 m/sec) | Hematite particles | 0.30 |
| Example 5 | Pin-type mill (peripheral speed: 45 m/sec) | Maghemite particles | 0.40 |
| Comparative Example 1 | Pin-type mill (peripheral speed: 45 m/sec) | Goethite particles | 0.30 |
| Comparative Example 2 | Pin-type mill (peripheral speed: 45 m/sec) | Goethite particles | 0.24 |
| Reference Example 1 | Henschel mixer (peripheral speed: 1440 rpm, 5 min) | Goethite particles | 0.25 |
| Reference Example 2 | None | Goethite particles | 0.25 |

| Examples and Comparative Examples | Properties of iron compound catalyst for inhibiting generation of dioxin | | | |
|---|---|---|---|---|
| | BET specific surface area ($m^2$/g) | Phosphorus content (wt. %) | Sulfur content (wt. %) | Sodium content (wt. %) |
| Example 1 | 85 | 0.002 | 0.05 | 0.08 |
| Example 2 | 83 | 0 | 0.01 | 0.05 |
| Example 3 | 80 | 0.001 | 0.01 | 0.06 |
| Example 4 | 52 | 0.002 | 0.01 | 0.07 |
| Example 5 | 37 | 0.005 | 0.02 | 0.05 |
| Comparative Example 1 | 71 | 0.49 | 0.06 | 0.18 |
| Comparative Example 2 | 90 | 0.01 | 0.01 | 0.15 |
| Reference Example 1 | 85 | 0.002 | 0.05 | 0.08 |
| Reference Example 2 | 85 | 0.002 | 0.05 | 0.08 |

| Examples and Comparative Examples | Properties of iron compound catalyst for inhibiting generation of dioxin | | |
|---|---|---|---|
| | Catalyst property (conversion percentage of carbon monoxide into carbon dioxide at 250° C.) (%) | Average particle size of aggregates ($D_{50}$) ($\mu$m) | Specific surface area of aggregates ($m^2/cm^3$) |
| Example 1 | 20 | 3.19 | 2.58 |
| Example 2 | 25 | 2.61 | 2.98 |

TABLE 1-continued

| | | | |
|---|---|---|---|
| Example 3 | 23 | 3.14 | 2.37 |
| Example 4 | 22 | 4.22 | 1.97 |
| Example 5 | 25 | 4.81 | 1.74 |
| Comparative Example 1 | 0.5 | 3.29 | 2.31 |
| Comparative Example 2 | 10 | 3.21 | 2.45 |
| Reference Example 1 | 20 | 9.51 | 0.78 |
| Reference Example 2 | 20 | 10.2 | 0.70 |

TABLE 2

Municipal solid waste incineration characteristics
Catalyst for inhibiting generation of dioxin

| Examples and Comparative Examples | Kind | Average particle size of aggregates ($D_{50}$) (μm) | Specific surface area of aggregates (m²/cm³) |
|---|---|---|---|
| Example 6 | Goethite particles obtained in Example 1 | 3.19 | 2.58 |
| Example 7 | Goethite particles obtained in Example 1 | 3.19 | 2.58 |
| Example 8 | Goethite particles obtained in Example 2 | 2.61 | 2.98 |
| Example 9 | Goethite particles obtained in Example 3 | 3.14 | 2.37 |
| Example 10 | Hematite particles obtained in Example 4 | 4.22 | 1.97 |
| Example 11 | Maghemite particles obtained in Example 5 | 4.81 | 1.74 |
| Example 12 | Hematite particles obtained in Example 4 | 4.22 | 1.97 |
| Comparative Example 3 | Goethite particles obtained in Comparative Example 1 | 3.29 | 2.31 |
| Comparative Example 4 | Goethite particles obtained in Comparative Example 2 | 3.21 | 2.45 |
| Comparative Example 5 | Goethite particles obtained in Example 1 | 3.19 | 2.58 |
| Comparative Example 6 | Goethite particles obtained in Reference Example 1 | 9.51 | 0.78 |
| Comparative Example 7 | Goethite particles obtained in Reference Example 2 | 10.2 | 0.70 |
| Comparative Example 8 | Goethite particles obtained in Example 1 | 3.19 | 2.58 |

Municipal solid waste incineration characteristics
Catalyst for inhibiting generation of dioxin

| Examples and Comparative Examples | Amount added (based on dry municipal solid waste) (wt.%) | Addition method | Addition position |
|---|---|---|---|
| Example 6 | 0.30 | Air carrying | Feed port 14 in FIG. 2 |
| Example 7 | 0.30 | Air carrying | Feed port 14 in FIG. 2 |
| Example 8 | 0.50 | Air carrying | Supplementary combustion burner port 17 in FIG. 2 |
| Example 9 | 0.45 | Air carrying | Supplementary combustion burner port 17 in FIG. 2 |
| Example 10 | 1.00 | Air carrying | Feed port 15 in FIG. 2 |
| Example 11 | 0.80 | Air carrying | Supplementary combustion burner port 17 in FIG. 2 |
| Example 12 | 1.00 | Air carrying | Feed port 15 in FIG. 2 |
| Comparative Example 3 | 0.50 | Air carrying | Feed port 14 in FIG. 2 |
| Comparative Example 4 | 0.50 | Air carrying | Feed port 15 in FIG. 2 |
| Comparative Example 5 | 0.50 | Mixed in municipal solid waste | Municipal solid waste-charging hopper |
| Comparative Example 6 | 0.30 | Air carrying | Feed port 14 in FIG. 2 |
| Comparative Example 7 | 1.00 | Air carrying | Feed port 14 in FIG. 2 |
| Comparative Example 8 | 0.30 | Air carrying | Feed port 14 in FIG. 2 |

Municipal solid waste incineration characteristics

| Examples and Comparative Examples | Catalyst for inhibiting generation of dioxin Amount of air sprayed (% by volume based on the volume of combustion air) | Air supplying Kind | Air supplying Addition position | Air supplying amount of air (% by volume based on the volume of combustion air) | Supplying portion into incinerator |
|---|---|---|---|---|---|
| Example 6 | 6.7 | — | — | — | — |
| Example 7 | 6.7 | Air | Feed port 16 in FIG. 2 | 6.7 | Tip end of combustion flame |
| Example 8 | 6.7 | — | — | — | — |
| Example 9 | 6.7 | — | — | — | — |
| Example 10 | 6.7 | — | — | — | — |
| Example 11 | 6.7 | — | — | — | — |
| Example 12 | 6.7 | Air | Feed port 14 in FIG. 2 | 6.7 | Tip end of combustion flame |
| Comparative Example 3 | 6.7 | — | — | — | — |
| Comparative Example 4 | 6.7 | — | — | — | — |
| Comparative Example 5 | — | — | — | — | — |
| Comparative Example 6 | 6.7 | — | — | — | — |
| Comparative Example 7 | 6.7 | — | — | — | — |

TABLE 2-continued

| | | | | | |
|---|---|---|---|---|---|
| Comparative Example 8 | 6.7 | Air | Supplementary combustion burner port 17 in FIG. 2 | 6.7 | Center of combustion flame |

| | Municipal solid waste incineration characteristics Content in exhaust gas | | |
|---|---|---|---|
| | Amount of dioxin generated | | Amount of hydrogen chloride generated |
| Examples and Comparative Examples | Start-up (ngTEQ/Nm³) | Steady operation (ngTEQ/Nm³) | Start-up (ppm) |
| Example 6 | 4.3 | 4.1 | 24 |
| Example 7 | 2.3 | 1.9 | 20 |
| Example 8 | 4.2 | 2.8 | 8 |
| Example 9 | 2.5 | 2.0 | 10 |
| Example 10 | 3.6 | 3.5 | 24 |
| Example 11 | 3.2 | 2.3 | 26 |
| Example 12 | 2.0 | 1.8 | 22 |
| Comparative Example 3 | 23 | 10 | 67 |
| Comparative Example 4 | 18 | 12 | 70 |
| Comparative Example 5 | 31 | 18 | 82 |
| Comparative Example 6 | 9.2 | 7.8 | 50 |
| Comparative Example 7 | 9.8 | 8.0 | 57 |
| Comparative Example 8 | 3.7 | 2.8 | 29 |

| | Municipal solid waste incineration characteristics Content in exhaust gas | | |
|---|---|---|---|
| | Amount of hydrogen chloride generated | Amount of carbon monoxide generated | |
| Examples and Comparative Examples | Steady operation (ppm) | Start-up (ppm) | Steady operation (ppm) |
| Example 6 | 17 | 53 | 21 |
| Example 7 | 15 | 19 | 8 |
| Example 8 | 9.2 | 23 | 9 |
| Example 9 | 7.3 | 21 | 7 |
| Example 10 | 16 | 52 | 12 |
| Example 11 | 13 | 42 | 22 |
| Example 12 | 10 | 18 | 8 |
| Comparative Example 3 | 45 | 202 | 58 |
| Comparative Example 4 | 58 | 110 | 52 |
| Comparative Example 5 | 71 | 151 | 97 |
| Comparative Example 6 | 35 | 80 | 43 |
| Comparative Example 7 | 38 | 78 | 46 |
| Comparative Example 8 | 20 | 35 | 20 |

What is claimed is:

1. An iron compound catalyst for inhibiting the generation of dioxin, consisting essentially of iron oxide particles, iron oxide hydroxide particles or mixture thereof and having not less than 18% by volume of a conversion percentage of carbon monoxide into carbon dioxide, said iron oxide particles or said iron oxide hydroxide particles having an average particle size of 0.02 to 0.1 $\mu$m, a BET specific surface area of 0.2 to 100 m²/g, a phosphorus content of less than or equal to 0.02% by weight, a sulfur content of less than or equal to 0.1% by weight and a sodium content of less than or equal to 0.2% by weight, wherein the conversion percentage is measured by:
(1) heat treating the iron compound catalyst in air at a temperature of 800° C. for 15 minutes; and
(2) instantaneously contacting $2.8 \times 10^{-4}$ mol of the heat-treated iron oxide particles with $6.1 \times 10^{-7}$ mol of carbon monoxide at a temperature of 250° C. at a space velocity (SV) of 42,400 h$^{-1}$ in an inert gas atmosphere using a pulse catalytic reactor, to measure the conversion percentage of carbon monoxide into carbon dioxide.

2. An iron compound catalyst for inhibiting generation of dioxin according to claim 1, wherein the BET specific surface area is 0.5 to 100 m²/g and the phosphorus content is less than or equal to 0.005% by weight.

3. An iron compound catalyst for inhibiting generation of dioxin according to claim 1, wherein the conversion percentage of carbon monoxide into carbon dioxide is at least 20% by volume.

4. An iron compound catalyst for inhibiting generation of dioxin according to claim 1, wherein said iron compound catalyst consisting essentially of aggregates consisting essentially of said iron oxide particles, said iron oxide hydroxide particles or the mixed particles thereof, said aggregates having a specific surface area of not less than 1.0 m²/cm³ when measured under a feed pressure of 1 bar in a dry granulometer, and an average particle size ($D_{50}$) of 50% of a total volume thereof, of up to 8.0 $\mu$m.

5. An iron compound catalyst for inhibiting generation of dioxin according to claim 4, wherein the specific surface area of said aggregates is at least 1.2 m²/cm³ when measured under a feed pressure of 1 bar in a dry granulometer, and the average particle size ($D_{50}$) is up to 7.0 $\mu$m.

6. An iron compound catalyst for inhibiting generation of dioxin according to claim 4, wherein said aggregates comprise said iron oxide particles, said iron oxide hydroxide particles or mixed particles of said iron oxide particles and said iron oxide hydroxide particles having an average particle size of 0.02 to 1.0 $\mu$m, a BET specific surface area of 0.5 to 100 m²/g, a phosphoms content of less than or equal to 0.005% by weight, a sulfur content of less than or equal to 0.1% by weight and a sodium content of less than or equal to 0.2% by weight.

7. An iron compound catalyst for inhibiting the generation of dioxin, consisting essentially of aggregates consisting essentially of iron oxide particles, iron oxide hydroxide particles or the mixture particles thereof and having a specific surface area of not less than 1.0 m²/cm³ when measured under a feed pressure of 1 bar in a dry granulometer, and an average particle size ($D_{50}$) of 50% of a total volume thereof, of up to 8.0 $\mu$m, and not less than 18% by volume of a conversion percentage of carbon monoxide into carbon dioxide, said iron oxide particles or said iron oxide hydroxide particles having an average particle size of 0.02 to 1.0 $\mu$m, a BET specific surface area of 0.2 to 100 m²/g, a phosphorus content of less than or equal to 0.02% by weight, a sulfur content of less than or equal to 0.1% by weight and a sodium content of less than or equal to 0.2% by weight, wherein the conversion percentage is measured by:

(1) heat treating the iron compound catalyst in air at a temperature of 800° .C for 15 minutes; and (2) instantaneously contacting $2.8 \times 10^{-4}$ mol of the heat-treated iron oxide particles with $6.1 \times 10^{-7}$ mol of carbon monoxide at a temperature of 250° C. at a space velocity (SV) of 42,400 $h^{-1}$ in an inert gas atmosphere using a pulse catalytic reactor, to measure the conversion percentage of carbon monoxide into carbon dioxide.

8. An iron compound catalyst for inhibiting the generation of dioxin, consisting essentially of aggregates consisting essentially of iron oxide particles, iron oxide hydroxide particles or the mixture particles thereof and having a specific surface area of not less than 1.2 $m^2/cm^3$ when measured under a feed pressure of 1 bar in a dry granulometer, and an average particle size ($D_{50}$) of 50% of a total volume thereof, of up to 7.0 μm, and not less than 15% by volume of a conversion percentage of carbon monoxide into carbon dioxide, said iron oxide particles or said iron oxide hydroxide particles having an average particle size of 0.02 to 1.0 μm, a BET specific surface area of 0.5 to 100 $m^2/g$, a phosphorus content of less than or equal to 0.005% by weight, a sulfur content of less than or equal to 0.1% by weight and a sodium content of less than or equal to 0.2% by weight, wherein the conversion percentage is measured by:

(1) heat treating the iron compound catalyst in air at a temperature of 800° C. for 15 minutes; and (2) instantaneously contacting $2.8 \times 10^{-4}$ mol of the heat-treated iron oxide particles with $6.1 \times 10^{-7}$ mol of carbon monoxide at a temperature of 250° C. at a space velocity (SV) of 42,400 $h^{-1}$ in an inert gas atmosphere using a pulse catalytic reactor, to measure the conversion percentage of carbon monoxide into carbon dioxide.

* * * * *